United States Patent [19]

Hutson et al.

[11] 3,954,309

[45] May 4, 1976

[54] HYDRODYNAMIC BEARINGS FOR VIBRATORY MECHANISMS

[75] Inventors: Richard Neil Hutson, Dallas; Kenneth J. Fewel, Arlington; William P. Goode, Dallas, all of Tex.

[73] Assignee: The Hutson Corporation, Arlington, Tex.

[22] Filed: Nov. 21, 1974

[21] Appl. No.: 525,872

[52] U.S. Cl. .................................. 308/9; 308/184 R
[51] Int. Cl.$^{2}$ .......................................... F16C 33/72
[58] Field of Search ............ 308/9, 122, 184 R, 189; 51/163, 313, 316

[56] References Cited

UNITED STATES PATENTS

| | | | |
|---|---|---|---|
| 3,214,871 | 11/1965 | Olson et al. | 51/316 |
| 3,305,977 | 2/1967 | Kellard | 51/163 |
| 3,650,582 | 3/1972 | Casey | 308/9 X |
| 3,707,058 | 12/1972 | Anderson et al. | 51/163 |
| 3,747,470 | 7/1973 | Ihoue et al. | 308/9 X |
| 3,785,708 | 1/1974 | Miyasaki | 308/9 |
| R27,412 | 6/1972 | Olson et al. | 51/163 |

*Primary Examiner*—Robert R. Song
*Assistant Examiner*—Richard A. Bertsch
*Attorney, Agent, or Firm*—Richards, Harris & Medlock

[57] ABSTRACT

A vibratory mechanism includes apparatus adapted for vibratory actuation to perform a predetermined function. A tubular housing is connected to the apparatus at spaced points, and a pair of hydrodynamic bearings are mounted in the housing at points located outwardly from the points of connection of the housing to the apparatus. A shaft is rotatably supported in the hydrodynamic bearings, and structure is provided for continuously directing oil to the hydrodynamic bearings and to thrust bearings which position the shaft axially. Oil from the bearings is directed to drain structure comprising part of the tubular housing. Eccentric weights are mounted on the shaft for rotation therewith and are positioned at points located outwardly from the hydrodynamic bearings. The shaft and the housing have matched deflection characteristics under loads imposed by the rotating eccentric weights so that the hydrodynamic bearings and the portions of the shaft extending therethrough are continuously maintained in precise alignment.

35 Claims, 4 Drawing Figures

HYDRODYNAMIC BEARINGS FOR VIBRATORY MECHANISMS

BACKGROUND AND SUMMARY OF THE INVENTION

This invention relates to hydrodynamic bearings for vibratory mechanisms, and more particularly to the use of hydrodynamic journal bearings as the primary support for the eccentric apparatus of industrial-type vibratory mechanisms.

At the present time vibratory mechanisms are utilized throughout industry to perform a wide variety of functions, such as consolidation of loose materials; loosening, separation and moving of particulate matter; reduction of particle size; and various machining, forming, finishing and surface treatment operations. For example, a vibration finishing machine includes a tub adapted to receive piece parts to be finished and a media which may comprise metal, glass, ceramic, plastic, wooden or composite materials, and which may take the shape of balls, cones, discs, cylinders, triangles, stars, pyramids, polyforms, and random shapes. The tub also receives a liquid such as water and may receive a finishing agent. The tub is supported for vibration and eccentric apparatus is utilized to impart vibratory energy to the tub and the contents thereof. By this means the piece parts and the media in the tub are actuated to move in a tumbling or rolling pattern which together with the vibration caused by the operation of the eccentric apparatus causes the media to perform the desired finishing operation on the piece parts.

The eccentric apparatus of commercially available vibratory machines usually comprises either a rotatably supported shaft having eccentric weights mounted thereon or an eccentric shaft. In either case the shaft of the eccentric apparatus utilized in present vibratory mechanisms is typically supported by means of antifriction bearings, such as ball bearings, roller bearings, or tapered roller bearings. Although antifriction bearings are presently utilized almost universally as the eccentric apparatus support in vibratory mechanisms, the use of such bearings for this purpose has been found to involve two distinct disadvantages. First, antifriction bearings involve the use of rolling components in contact with non-rolling components. As the speeds and radial loads on such bearings are increased, this contact results in the generation of extreme localized heating. This heating is detrimental to the bearing components in that the heat treated surfaces are reduced in hardness and eventually fail. Second, the bearing components are subjected to repeated tensil, compressive, and torsional loads. Even though the components may not be stressed beyond their elastic range, this periodic loading eventually causes fatigue which leads to bearing failure. These and other factors result in relatively rapid bearing failure in presently available vibratory mechanisms, and in fact one of the most persistent problems that is encountered in the use of such devices is the frequent necessity of replacing the bearings which support the eccentric apparatus.

In attempting to overcome the foregoing and other difficulties long since associated with the use of antifriction bearings in vibratory mechanisms, it has been proposed to support the eccentric apparatus of such mechanisms by means of hydrodynamic bearings. As is well known to those skilled in the art, such bearings are characterized by a thin film of lubricant between the relative moving parts, whereby no actual contact between the parts occurs. By this means all problems involving possible fatigue of the component parts of the bearings are eliminated. Moreover, by controlling the temperature of the lubricant it is possible to eliminate problems involving localized excessive heating of the component parts of such bearings.

It has been found, however, that the mere substitution of journal bearings for antifriction bearings as the support structure for the eccentric apparatus of a vibratory mechanism does not provide an operable result. To the contrary, it has been found that such a substitution leads to rapid wear and often to catastrophic failure of the journal bearing structure. While this phenomenon is not completely understood, it is theorized that it is caused by misalignment of the rotating shaft with respect to the hydrodynamic bearings. It is believed that such misalignment causes localized depletion of the lubricant film between the shaft and the bearings, whereby the adjacent metal parts come into actual physical contact leading to rapid wear and localized heating, and ultimately to bearing failure.

In accordance with the present invention, the foregoing and other difficulties long since associated with the prior art are overcome, whereby the use of hydrodynamic bearings as the primary support for the eccentric apparatus of a vibratory mechanism is facilitated. In accordance with the broader aspects of the invention, a vibratory mechanism includes apparatus adapted for vibratory actuation to perform a predetermined function. A housing is connected to the apparatus and in turn supports hydrodynamic journal bearings. An eccentric apparatus includes a shaft which is rotatably supported in the journal bearings. Upon rotation of the shaft, the eccentric apparatus generates vibration which is transmitted through the journal bearings and the housing to the function performing apparatus. The shaft and the housing have matched deflection characteristics under the loads imposed by the eccentric apparatus, whereby the hydrodynamic journal bearings and the portions of the shaft extending therethrough are continuously maintained in precise alignment. By this means the vibratory mechanism is provided with substantially infinite bearing life.

In actual practice it has been found that the use of the present invention provides advantages in addition to substantially increased bearing life. Thus, by means of the invention it is possible to provide between about five and about ten times as much energy input to the mechanism as is possible when antifriction bearings are employed as the primary support for the eccentric apparatus. Simultaneously, it is possible to operate the eccentric apparatus between about two times and about four times as fast as is possible when antifriction bearings are employed. Both of these factors tend to dramatically improve the operating performance of a vibratory mechanism utilized in the present invention.

DESCRIPTION OF THE DRAWINGS

A more complete understanding of the invention may be had by reference to the following detailed description when taken in conjunction with the accompanying drawings, wherein.

DETAILED DESCRIPTION

Figure 1:
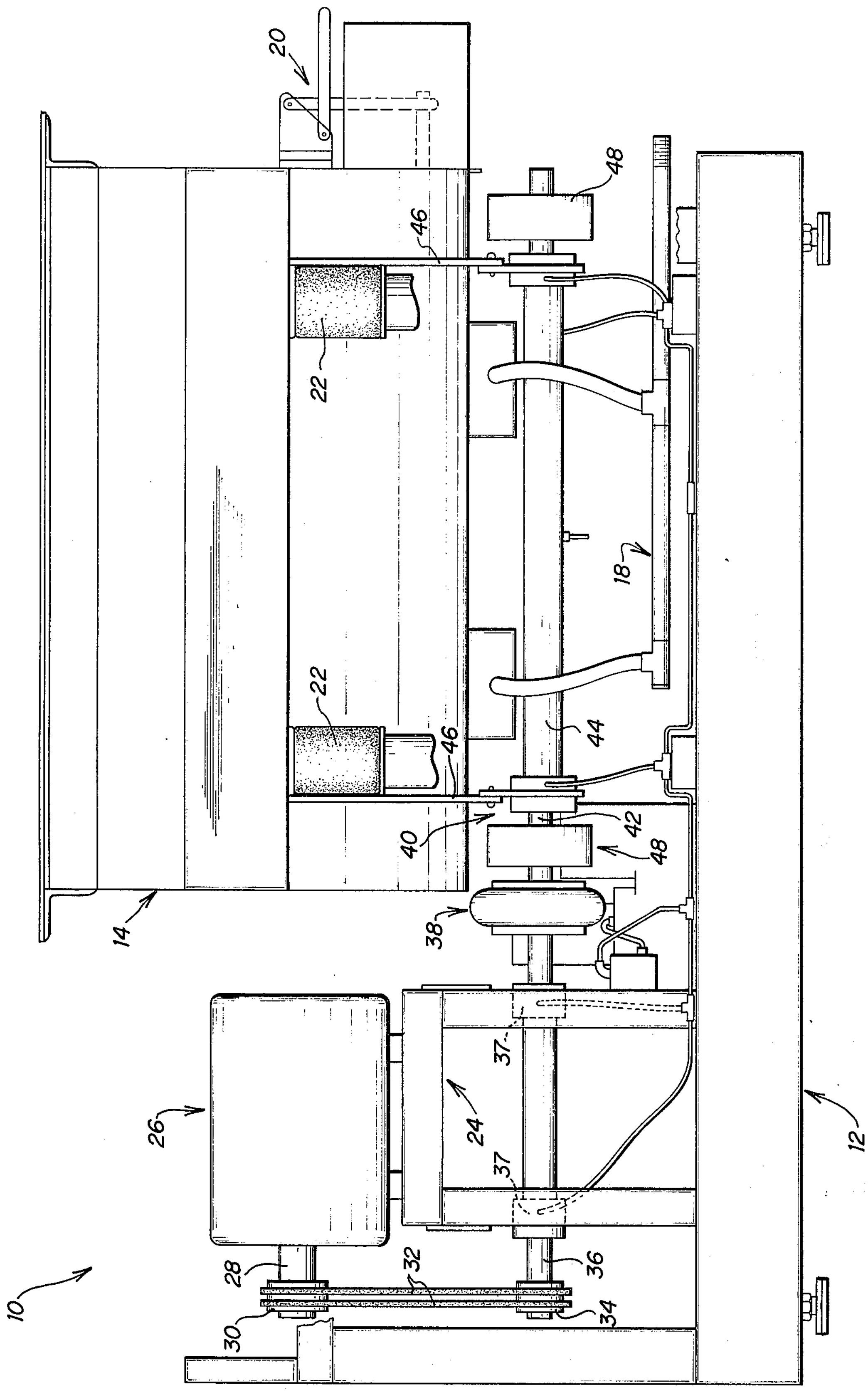
FIG. 1 is a sectional view illustrating a vibratory mechanism incorporating the invention.

Referring now to the drawings, and particularly to FIG. 1 thereof, there is shown a vibratory mechanism incorporating the present invention. The particular vibratory mechanism illustrated in FIG. 1 comprises a vibratory finishing machine 10. However, as will become more apparent hereinafter, the invention is equally applicable to numerous other types of vibratory mechanisms.

The vibratory finishing machine 10 includes a frame 12 which supports the various operating components of the machine. A tub 14 is generally U-shaped in cross-section and may be provided with suitable covers. A drain system 18 is provided for selective actuation to withdraw liquids from the tub 14, and apparatus 20 is provided at one end of the tub 14 to facilitate the removal of piece parts and media therefrom. The tub 14 is supported on the frame 12 by means of springs 22, which in the vibratory finishing machine 10 shown in FIG. 1 comprise air bags.

A subframe 24 supports a motor 26 which may comprise an electric motor, a hydraulic motor, etc. The motor 26 has an output shaft 28 which has a pulley 30 secured thereto. One or more belts 32 extend around the pulley 30 and a pulley 34 secured to a drive shaft 36. The drive shaft 36 is rotatably supported on the subframe 24 by means of a pair of bearings 37 which may comprise antifriction bearings. The drive shaft 36 is connected through a flexible coupling 38 to an eccentric apparatus 40.

The eccentric apparatus 40 includes a shaft 42 which is connected to the drive shaft 36 through the flexible coupling 38. The shaft 42 extends through a housing 44 and is supported therein by means of hydrodynamic journal bearings. The housing 44 is connected to the tub 14 by means of brackets 46. Eccentric weight assemblies 48 are secured to the opposite ends of the shaft 42 for rotation therewith.

In the operation of the vibratory finishing machine 10, the tub 14 is filled with piece parts to be finished together with a suitable media. A liquid such as water is also typically admitted to the tub 14. Various finishing or polishing agents may also be utilized in the operation of the vibratory finishing machine 10.

The piece parts which are finished by the vibratory finishing machine 10 may be of almost any conceivable size; material, and shape. The media may comprise various materials such as metal, glass, ceramic, various woods, various plastics, or composite materials. Moreover, the media may be of various shapes such as balls, cones, discs, cylinders, triangles, stars, pyramids, polyforms, and random shapes. The criteria for the selection of the media to be used in a particular finishing operation are well known to those skilled in the art.

After the tub 14 has been filled, the motor 26 is actuated which in turn effects actuation of the eccentric apparatus 40. Operation of the eccentric apparatus 40 involves rotation of the shaft 42 and the eccentric weight assemblies 48 mounted thereon, thereby causing vibration. The vibration caused by the operation of the eccentric apparatus 40 is transmitted through the hydrodynamic bearings, the housing 44 and the brackets 46 to the tub 14, and ultimately to the contents of the tub 14. The vibration of the tub 14 under the action of the eccentric apparatus 40 causes the piece parts and the media in the hopper to move in a tumbling or rolling pattern. This movement together with the vibration of the contents of the tub 14 under the action of the eccentric apparatus 40 effects the desired finishing operation. At the conclusion of the finishing operation the tub 14 is emptied by means of the drain apparatus 18 and the apparatus 20.

Figure 2:
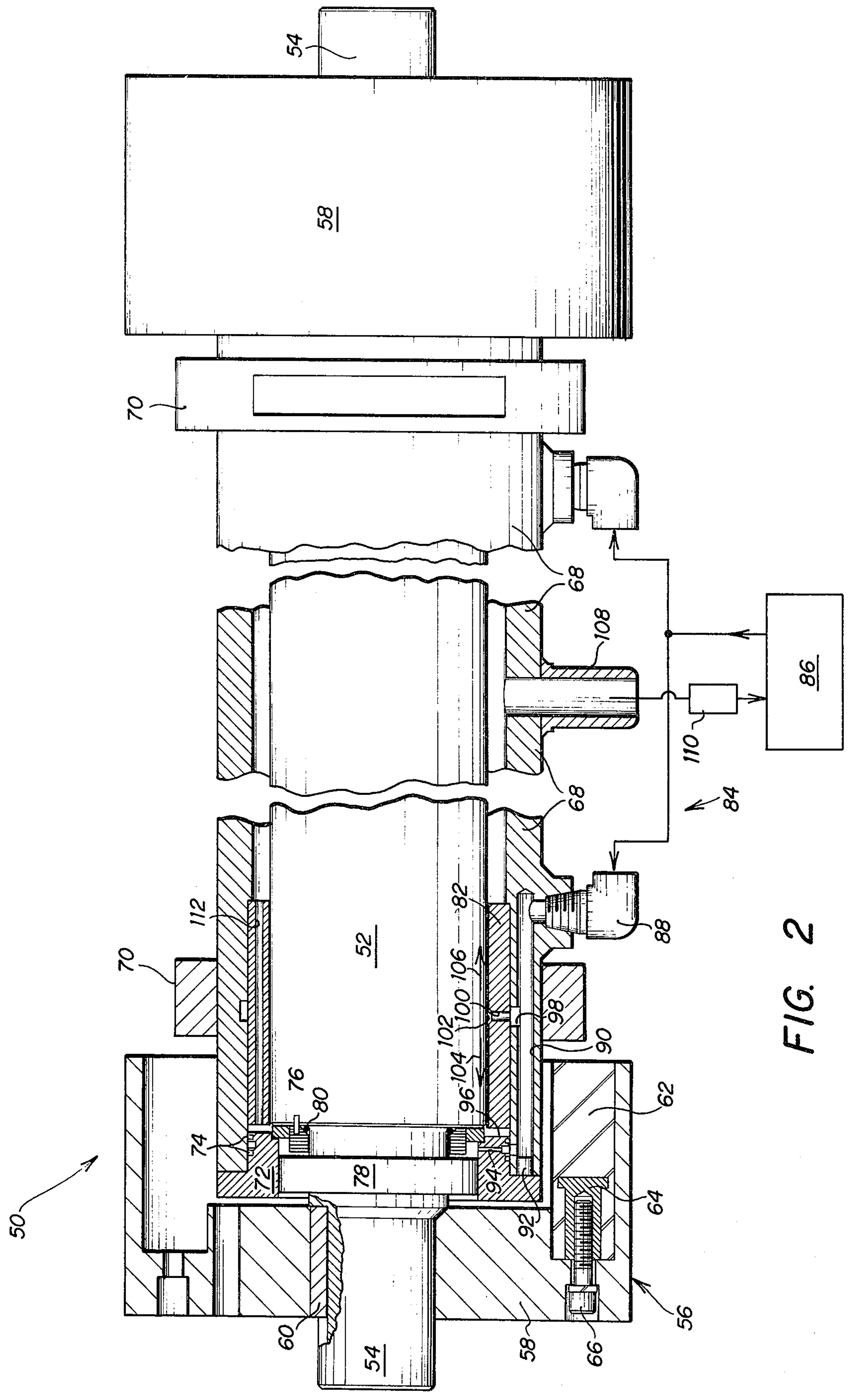
FIG. 2 is a sectional view illustrating an eccentric apparatus incorporating a first embodiment of the invention.

Referring to FIG. 2, there is shown an eccentric apparatus 50 incorporating a first embodiment of the present invention and adapted for use in a vibratory mechanism, such as the vibratory mechanism described hereinbefore in connection with FIG. 1 or in various other types of vibratory mechanisms. The eccentric apparatus 50 includes a shaft 52 which may be formed from steel, or the like. The shaft 52 is of generally uniform diameter throughout its length, but is provided with reduced diameter end portions 54. A pair of eccentric weight assemblies 56 are mounted at the opposite ends of the shaft 52 on the reduced diameter portions 54 thereof.

Each eccentric weight assembly includes a weight housing 58 which is secured to the reduced diameter end of the shaft 52 for rotation with the shaft 52 by means of a conventional key 60 that is received in conventional keyways formed in the housing 58 and the shaft 52. One or more weights 62 are mounted in the housing 58 for rotation with the shaft 52 depending on the magnitude of energy input that is required for a particular operation. The weights may be formed from lead and have steel inserts 64 received therein. The weights 62 are secured in the housing 58 by means of fasteners 66 which are threadedly received in the steel inserts 64.

The shaft 52 extends through a tubular housing 68 which extends substantially the entire length of the shaft 52. Brackets 70 are provided on the housing 68 whereby the eccentric apparatus 50 may be secured to a vibratory mechanism. An end cap 72 is received in each end of the housing 68 and is secured by means of conventional fasteners. O-ring seals 74 are provided between the housing 68 and the end caps 72.

Conventional thrust bearings 76 are provided between the end caps 72 and the adjacent ends of the large diameter portions of the shaft 52, and function to axially position the shaft 52. The interface between the shaft 52 and the housing 68 is provided with a seal 78 which may comprise a conventional dynamic seal. For example, a conventional carbon face seal may be utilized in the eccentric apparatus 50. Such a seal may be provided with an O-ring seal 80 at the interface thereof with the shaft 52.

The shaft 52 is rotatably supported in the housing 68 by means of a pair of hydrodynamic journal bearings 82. The bearings 82 may be formed from one of the conventional bronze bearing materials, for example, SAE64 bronze. The bearings 82 are positioned at the opposite ends of the large diameter portion of the shaft 52. It should be noted that both the brackets 70 and the weights 62 overlie at least portions of the hydrodynamic journal bearings 82. The relative positioning of these component parts of the eccentric apparatus 50 comprises an important feature of the present invention.

The eccentric apparatus 50 further includes a forced lubrication system 84. The system 84 includes a source of pressurized fluid lubricant 86, which may comprise a reservoir and a pump for supplying lubricating oil under relatively light pressure, Pressurized fluid lubricant from the source 86 is received in a pair of fittings 88 and is directed to passageways 90 which extend axially into the opposite ends of the housing 68.

The opposite ends of the passageways 90 are sealed by means of plugs 92. Adjacent thereto passageways 94 are formed through the housing 68 and the end caps 72, and serve to direct lubricant to the thrust bearings 76. Lubricant passing through the thrust bearings 76 is received in annular passageways 96 extending between the end caps 72 and the hydrodynamic journal bearings 82.

Lubricant from the passageways 90 is also received in a pair of annular passageways 98 formed in the housing 68 adjacent to the exterior periphery of the hydrodynamic journal bearings 82. From the annular passageways 98 the lubricant flows through a plurality of radially extending apertures 100 formed through the bearings 82 and into annular passageways 102 formed in the interior periphery thereof. The lubricant then flows outwardly through the spaces between the hydrodynamic journal bearings 82 an the shaft 52 in the directions indicated by the arrows 104 and 106.

Lubricant following the paths indicated by the arrow 106 ultimately enters the space between the shaft 52 and the housing 68. The lubricant then flows through a drain fitting 108 mounted in the housing 68 and is returned through an appropriate filter 116 to the source 86. Lubricant following the paths indicated by the arrow 104 enters the annular passageways 96 and is then directed to the space between the shaft 52 and the housing 68 through a plurality of axially extending passageways 112 formed in the hydrodynamic journal bearings 82.

In the operation of the eccentric apparatus 50, the shaft 52 is rotated by means of a suitable mechanism. For example, the shaft 52 may be connected to the flexible coupling 38 illustrated in FIG. 1. Upon rotation of the shaft 52 the eccentric weight assembly 56 is rotated, thereby generating vibration. This vibration is transmitted through the hydrodynamic journal bearings 82, the housing 68 and the brackets 70 to a vibratory mechanism. For example, the brackets 70 may be connected to the brackets 46 as shown in FIG. 1.

Figure 4:
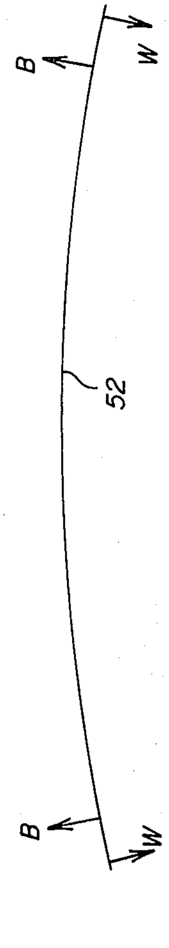
FIG. 4 is a schematic illustration of the operation of the invention.

The operation of the eccentric apparatus 50 and the significance of the present invention will be better understood by reference to FIG. 4. As the shaft 52 rotates, the rotating eccentric weights 62 continuously generate forces on the opposite ends of the shaft 52 which are illustrated in FIG. 4 by the arrows W. These forces are wholly contained by the hydrodynamic bearings at B and the apparatus connected thereto in the manner illustrated by the arrows B. Nevertheless, there is formed a moment which extends along the entire length of the shaft 52 and which causes the shaft 52 to assume a bowed configuration (greatly exaggerated in FIG. 4). It will be understood that the outwardly bowed configuration of the shaft 52 rotates therewith in the operation of the eccentric apparatus 50.

Referring again to FIG. 2, it has been found that if an attempt is made to support the rotating shaft of an eccentric apparatus in hydrodynamic journal bearings without special design consideration, the bearings are subject to rapid wear, and sometimes to catastrophic failure. While this phenomenon may have other causes, it is certain that it will occur due to misalignment between the shaft and the bearings, and that such misalignment is caused by the bowed configuration of the shaft as illustrated in FIG. 4.

In accordance with the present invention, it has been found that the rapid wear and/or failure heretofore experienced in the use of hydrodynamic bearings in eccentric apparatus can be eliminated if the deflection characteristics of the housing which support the hydrodynamic bearings are matched to the deflection characteristics of the shaft extending therethrough. Thus, in the embodiment of the invention illustrated in FIG. 2, the dimensions of the housing 68 are carefully selected so that the housing 68 deflects identically to the shaft 52 under the loads imposed by the rotating eccentric weights 62. In this manner the working life of the hydrodynamic bearings 82 of the eccentric apparatus is greatly extended. In actual practice, it has been found that by matching the deflection characteristics of the shaft 52 and the housing 68, the service life of the bearings 82 is extended indefinitely, such that substantially infinite bearing life is realized.

Advantages in addition to greatly extended bearing life are also realized by means of the present invention. Thus, it has been found that by means of the present invention an eccentric apparatus can be operated to provide between about five times and about ten times as much energy input to a vibratory mechanism as is possible with the use of conventional antifriction bearings to support the rotating shaft of the eccentric apparatus. Moreover, it has been found that by means of the present invention the speed of operation of an eccentric apparatus may be increased by between about two times and about four times over that which is possible with conventional antifriction bearings. Both of these characteristics are highly desirable in that they tend to substantially decrease the amount of time that is necessary to operate a vibratory mechanism in order to accomplish a predetermined function.

Figure 3:
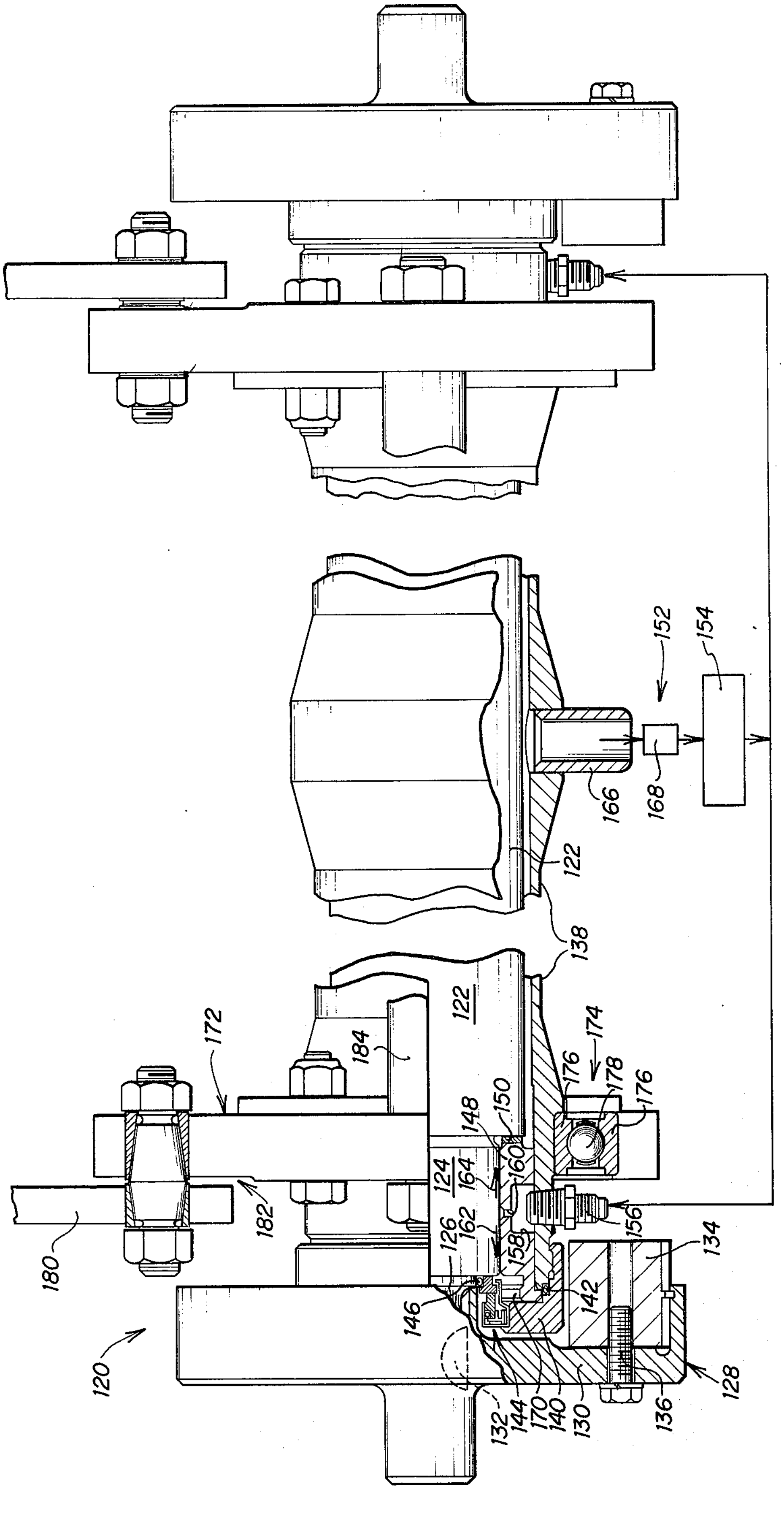
FIG. 3 is a sectional view illustrating an eccentric apparatus incorporating a second embodiment of the invention.

Referring now to FIG. 3, there is shown an eccentric apparatus 120 incorporating a second embodiment of the invention. The eccentric apparatus 120 includes a shaft 122 having reduced diameter bearing receiving portions 124 and reduced diameter end portions 126 formed at the opposite ends thereof. A pair of eccentric weight assemblies 128 are secured to the opposite ends of the shaft 122. Each eccentric weight assembly 128 includes a housing 130 which is secured to the end portion 126 of the shaft 122 by means of a conventional key 132 which is received in conventional keyways formed in the shaft and in the housing. Additional retaining apparatus may be utilized to secure the housing 130 to the shaft. One or more eccentric weights 134 are secured to the housing 130 by means of threaded fasteners 136. The number of eccentric weights that is utilized for a particular application depends on the level of vibratory energy that is to be provided in the operation of the eccentric apparatus 120.

The shaft 122 extends to a housing 138 which extends substantially the entire length of the shaft 122. The housing 138 is provided with a pair of end caps 140 which are threadedly secured to the opposite ends of the housing. An O-ring seal 142 is provided between each end cap 140 in the adjacent end of the housing 138. A dynamic seal 144 is provided at the interface between the housing 138 and the shaft 122. For example, a dynamic seal 144 may comprise a conventional carbon face seal. A rubber seal 146 may be provided between the seal 144 and the shaft 122.

The shaft 122 is rotatably supported in the housing 138 by means of a pair of hydrodynamic journal bearings 148. The bearings 148 are positioned in the opposite ends of the housing 138 and receive the reduced diameter portions 124 of the shaft 122. Again, the relative positioning of the bearings 148 with respect to the remaining component parts of the eccentric apparatus 120 comprises an important feature of the present invention. The inner end of each bearing 148 comprises a thrust bearing 150 which serves to axially position the shaft 122 relative to the housing 138.

The eccentric apparatus 120 includes a forced lubrication system 152 including a source of pressurized fluid lubricant 154. For example, the source 154 may comprise a reservoir and a pump for supplying lubricating oil under moderate pressure. Pressurized fluid lubricant from the source 154 is directed through a pair of fittings 156 secured in the housing 138 and into passageways 158 formed in the bearing 148. From the passageways 158 the lubricant flows through a radial groove 160 into the spaces between the bearings 148 and the reduced diameter portions 124 of the shaft 122. The lubricant flows both inwardly and outwardly through these spaces as indicated by the arrows 162 and 164.

Lubricant flowing in the direction of the arrow 164 flows through the thrust bearings 150 and then into the space between the shaft 122 and the housing 138. The lubricant flows through this space to a drain fitting 166 and is then returned to the source 154 through a suitable filter 168. Lubricant flowing in the direction of the arrow 162 is accumulated in an annular passageway 70 and is then directed to the space between the shaft 122 and the housing 138 through axially extending passageways formed in the bearings 148 similarly to the passageways 112 shown in FIG. 2.

The eccentric apparatus 120 is mounted in a vibratory mechanism by means of brackets 172. The brackets 172 are secured to the housing 138 by means of ball bearings 174 including races 176 and balls 178. It will be understood that in the operation of the eccentric apparatus 120, the housing 138 does not rotate relative to the brackets 172. Rather, the function of the ball bearings 174 is to allow unrestrained deflection of the housing 138 in order to match the deflection of the shaft 122 under loads imposed by the rotating eccentric weights 134. This is possible due to the fact that the radius of curvature of the races 176 of the ball bearings 174 is slightly larger than the radius of curvature of the balls 178. This permits between about five and about ten minutes of angular motion with a very small restraint from the supports.

The brackets 172 may be connected to brackets 180 depending from a vibratory mechanism by means of an offset connection of the type illustrated at 182. This type of connection introduces an additional moment in the operation of the eccentric apparatus 120 under the action of the rotating eccentric weights 134. When the weights 134 are positioned to generate loads in a lateral direction with the connections 182, this moment would be transmitted through the ball bearings 174. Therefore, additional restraint is necessary when the weights 134 are situated to operate laterally directed loads to the connections 182. For this reason, rods 184 are connected between the brackets 172 at the opposite ends of the eccentric apparatus 120 to carry the additional moment caused by the offset connections 182 by compression in one rod and tension in the other.

In the operation of the eccentric apparatus 120, the shaft 122 is rotated by a suitable mechanism. For example, the shaft 122 may be connected to the flexible coupling 38 illustrated in FIG. 1. Upon rotation of the shaft 122 the eccentric weights 134 rotate therewith, thereby generating vibration. This vibration is transmitted to a vibratory mechanism through the hydrodynamic journal bearings 148, the housing 138, the ball bearings 174, the brackets 172, and the connections 182. In this manner, the eccentric apparatus 120 provides a vibratory energy input to the vibratory mechanism.

The use of the embodiment of the invention illustrated in FIG. 3 provides substantially the same advantages as the use of the embodiment of the invention illustrated in FIG 2. Thus, due to the fact that the deflection characteristics of the housing 138 and the shaft 122 are matched under the loads induced by the rotating eccentric weights 134, substantially infinite bearing life is obtained. Moreover, it has been found that by means of the invention the permissible level of energy input which can be obtained using the eccentric apparatus 120 is increased by between about five times and about ten times with respect to the permissible energy input when conventional antifriction bearings are used. Finally, the operational speed of the eccentric apparatus 120 is increased by a factor of between about two times and about four times over that which is permissible when conventional antifriction bearings are used.

As has been pointed out above, it is critical to the present invention that the deflection of the housing be matched to that of the shaft. It is also important that the eccentric weight be positioned near the center of the bearing to minimize the bending moment applied to the shaft between the two bearings. Given that:

$I_s$ = moment of inertia of shaft cross section in the area between the bearings $I_h$ = moment of inertia of housing cross section in the area between the bearings $D_s$ = distance that housing support flange shear face is inboard of the centerline of bearing $D_w$ = distance that the center of gravity of the eccentric weight is outboard of the centerline of bearing Then, in accordance with the present invention, the following ratio must be substantially maintained (assuming constant cross sections):

$$I_s/I_h = D_w/D_s$$

The limitations of the application of this principle of deflection matching, based upon the moment of inertia of the shaft and the moment of inertia of the housing, are the deflection restraint of the housing support flange. With reference to FIG. 4, it is apparent that unless the support flange does in fact bend in proportion to the deflection of the housing, it applies a restraining moment which can cause the deflection of the housing in the localized area near the journal to change in slope and therefore limit the amount of matching that is possible. In the two designs illustrated, two embodiments of the principle by which this deflection restraint can be minimized are used. In FIG. 2, a suitable ratio between the reaction forces caused by the eccentric weight to the centerline of the bearing and from the restraint forces caused by the housing supports 70 can be obtained such that the structure will mechanically hold the forces involved due to the eccentric loads and yet be practical in terms of bending restraint. In the embodiment shown in FIG. 3, the location of the eccentric weights causes the vibrating force to locate the distances $D_s$ and $D_w$ in proportion to the moments of inertia $I_s$ and $I_h$ such that a practical restraining moment is not readily obtained. Therefore, in the embodiment of FIG. 3 the use of the ball bearing gimble is employed such that the rotary restraining force caused by the support is of such a small magnitude that deflection matching caused by the mechanical design of the various shaft and housing support structures can meet the criteria of deflection matching.

In practical applications of the invention, design refinements such as variable shaft and housing cross sections and variable mechanical properties of the materials such as tensil strength and modulous of elasticity can also be varied to optimize and create deflection matching of the housing and the shaft. This basic principle is, however, the underlining guide rule on which the design of vibratory mechanisms incorporating the invention must be based.

Those skilled in the art will appreciate the fact that whereas the foregoing description has centered around the use of the present invention in vibratory finishing machines, the invention is equally adapted for use in various other types of vibratory mechanisms. For example, the present invention is readily adapted for use in such diverse devices as industrial vibrators, vibrating screeners, vibrating deburring machines, vibrating motors, vibrating polishers, vibrating conveyors, and the like. Those skilled in the art will readily identify numerous additional vibratory mechanisms in which the present invention will find utility.

Although preferred embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. A mechanism comprising:
apparatus responsive to vibratory actuation for preforming a predetermined function;
eccentric means including a shaft;
means for rotating the shaft and thereby actuating the eccentric means to generate vibration;
a housing connected to the apparatus;
hydrodynamic bearing means mounted in the housing and rotatably supporting the shaft of the eccentric means whereby vibration is transmitted from the eccentric means through the hydrodynamic bearing means and the housing to the apparatus;
said housing and said shaft having matched deflection characteristics under the action of the eccentric means.

2. The mechanism according to claim 1 wherein the housing is tubular and wherein the hydrodynamic bearing means comprises a pair of hydrodynamic bearings mounted at spaced points in the housing.

3. The mechanism according to claim 1 further including means for directing a fluid lubricant to the hydrodynamic bearings.

4. The mechanism according to claim 3 further including thrust bearing means for locating the shaft axially and wherein the lubrication directing means also directs the fluid lubricant to the thrust bearing means.

5. The mechanism according to claim 3 wherein the lubricating directing means directs fluid lubricant to the midportion of each hydrodynamic bearing so that the fluid lubricant flows outwardly through the space between the bearing and the shaft, and wherein the tubular housing includes drain means for receiving lubricant from the hydrodynamic bearings.

6. A mechanism comprising:
apparatus responsive to vibratory actuation for performing a predetermined function;
eccentric means including a shaft;
means for rotating the shaft ahd thereby actuating the eccentric means to generate vibration;
a tubular housing connected to the apparatus;
hydrodynamic bearing means mounted in the housing and rotatably supporting the shaft of the eccentric means whereby vibration is transmitted from the eccentric means through the hydrodynamic bearing means and the housing to the apparatus;
said housing and said shaft having matched deflection characteristics under the action of the eccentric means;
the hydrodynamic bearing means comprising a pair of hydrodynamic bearings mounted at spaced points in the housing;
the tubular housing being connected to the apparatus at spaced points located inwardly from the positions of the hydrodynamic bearings.

7. The mechanism according to claim 6 wherein the eccentric means comprises eccentric weights mounted on the shaft for rotating therewith and positioned outwardly from the locations of the hydrodynamic bearings.

8. A mechanism for performing a predetermined function including:
apparatus responsive to vibratory actuation for performing the predetermined function;
a housing;
means connecting the housing to the apparatus;
eccentric means including a shaft extending through the housing;
a pair of hydrodynamic bearings mounted in the housing for rotatably supporting the shaft; and
means for rotating the shaft of the eccentric means and thereby imparting vibration to the apparatus through the hydrodynamic bearings and the housing;
said shaft and said housing having matched deflection characteristics under loads imposed by the eccentric means whereby the hydrodynamic bearings and the portions of the shaft extending therethrough are continuously maintained in precise alignment.

9. The mechanism according to claim 8 further characterized by means for continuously maintaining lubrication in the spaces between the hydrodynamic bearings and the shaft.

10. The mechanism according to claim 9 wherein the lubrication means is further characterized by means for continuously directing fluid lubricant into the spaces between the hydrodynamic bearings and the shaft, and wherein the housing means includes drain means for receiving lubricant from the spaces between the hydrodynamic bearings and the shaft.

11. The mechanism according to claim 10 wherein the lubrication means is further characterized by means for continuously directing fluid lubricant to the midportion of the hydrodynamic bearings so that the lubricant flows outwardly in both directions through the spaces between the hydrodynamic bearings and the shaft, said drain means in the housing for receiving lubricant directly from one end of each hydrodynamic bearing, and further characterized by passageways formed through the hydrodynamic bearing for returning lubricant from the opposite ends thereof to the drain means.

12. The mechanism according to claim 11 further including thrust bearing means for positioning the shaft axially, and wherein the lubrication means further functions to direct fluid lubricant to the thrust bearing means.

13. A mechanism for performing a predetermined function including:

apparatus responsive to vibratory actuation for performing the predetermined function;

a housing;

means connecting the housing to the apparatus;

eccentric means including a shaft extending through the housing;

a pair of hydrodynamic bearings mounted in the housing for rotatably supporting the shaft;

means for rotating the shaft of the eccentric means and thereby imparting vibration to the apparatus through the hydrodynamic bearings and the housing;

said shaft and said housing having matched deflection characteristics under loads imposed by the eccentric means whereby the hydrodynamic bearings and the portions of the shaft extending therethrough are continuously maintained in precise alignment;

the connecting means connecting the housing to the apparatus at spaced points; and the hydrodynamic bearings being mounted at spaced points in the housing located outwardly from the positions of the connections between the housing and the apparatus.

14. The mechanism according to claim 13 wherein the eccentric means comprises eccentric weights mounted on the shaft for rotation therewith and positioned outwardly from the locations of the hydrodynamic bearings.

15. In a vibratory mechanism of the type wherein an eccentric apparatus including a shaft is rotated to generate vibration, the shaft is rotatably supported by hydrodynamic bearings, the hydrodynamic bearings are mounted in a housing, and the housing is connected to the apparatus responsive to vibratory actuation for performing a predetermined function such that vibration generated upon rotation of the eccentric apparatus is transmitted through the hydrodynamic bearings and the housing to the apparatus for performing the predetermined function, characterized by the fact that the shaft and the housing have matched deflection characteristics under loads imposed by the rotating eccentric apparatus, whereby the hydrodynamic bearings and the portions of the shaft extending therethrough are continuously maintained in precise alignment.

16. The vibratory mechanism according to claim 15 wherein the housing is tubular, wherein the shaft extends through the housing, and wherein the hydrodynamic bearings are mounted at spaced points in the housing.

17. In a vibratory mechanism of the type wherein an eccentric apparatus including a shaft is rotated to generate vibration, the shaft is rotatably supported by hydrodynamic bearings, the hydrodynamic bearings are mounted in a housing, and the housing is connected to the apparatus responsive to vibratory actuation for performing a predetermined function such that vibration generated upon rotation of the eccentric apparatus is transmitted through the hydrodynamic bearings and the housing to the apparatus for performing the predetermined function, characterized by the fact that the shaft and the housing have matched deflection characteristics under loads imposed by the rotating eccentric apparatus, whereby the hydrodynamic bearings and the portions of the shaft extending therethrough are continuously maintained in precise alignment, the housing being tubular, the shaft extending through the housing, the hydrodynamic bearings being mounted at spaced points in the housing, and the tubular housing being connected to the apparatus at spaced points located immediately inwardly from the positions of the hydrodynamic bearings in the housing.

18. The vibratory mechanism according to claim 17 wherein the eccentric apparatus is further characterized by eccentric weight means mounted on the shaft for rotation therewith and positioned just outwardly of the locations of the hydrodynamic bearings.

19. The vibratory mechanism according to claim 18 further including means for directing fluid lubricant to each of the hydrodynamic bearings, and drain means in the housing for receiving the fluid lubricant from the hydrodynamic bearings.

20. The vibratory mechanism according to claim 19 further including thrust bearing means for positioning the shaft axially, and wherein the fluid lubricant directing means also directs fluid lubricant to the thrust bearing means.

21. A mechanism comprising:

structure for receiving piece parts to be operated on by means of vibration;

means mounting the piece part receiving structure for vibration;

a tubular housing connected to the piece part receiving structure at spaced points;

a shaft extending through the tubular housing;

a pair of hydrodynamic bearings mounted in the tubular housing and rotatably supporting the shaft;

eccentric weight means mounted on the shaft for rotation therewith;

means for rotating the shaft and the eccentric weight means mounted thereon and thereby generating vibration which is transmitted to the apparatus for receiving piece parts through the hydrodynamic bearings and the housing;

the shaft and the tubular housing having matched deflection characteristics under the loads imposed by rotation of the shaft and the eccentric weight means mounted thereon to generate vibration whereby the hydrodynamic bearings and the portions of the shaft extending therethrough are maintained in precise alignment.

22. A mechanism comprising:

structure for receiving piece parts to be operated on by means of vibration;

means mounting the piece part receiving structure for vibration;

a tubular housing connected to the piece part receiving structure at spaced points;

a shaft extending through the tubular housing;

a pair of hydrodynamic bearings mounted in the tubular housing and rotatably supporting the shaft;

eccentric weight means mounted on the shaft for rotation therewith;

means for rotating the shaft and the eccentric weight means mounted thereon and thereby generating vibration which is transmitted to the apparatus for receiving piece parts through the hydrodynamic bearings and the housing;

the shaft and the tubular housing having matched deflection characteristics under the loads imposed by rotation of the shaft and the eccentric weight means mounted thereon to generate vibration whereby the hydrodynamic bearings and the portions of the shaft extending therethrough are maintained in precise alignment;

the tubular housing being connected to the apparatus for receiving piece parts at spaced points;

the hydrodynamic bearings being mounted within the tubular housing at positions located just outwardly from the points of connection of the tubular housing to the apparatus for receiving piece parts; and the eccentric weights being mounted on the shaft at points located just outwardly of the positions of the hydrodynamic bearings.

23. The vibratory mechanism according to claim 22 further including thrust bearing means for axially positioning the shaft relative to the housing.

24. The vibratory mechanism according to claim 23 further characterized by means for directing fluid lubricant to the hydrodynamic bearings and the thrust bearing means, and wherein the tubular housing further comprises drain means for receiving fluid lubricant from the hydrodynamic bearings and the thrust bearing means.

25. The vibratory mechanism according to claim 24 wherein the fluid lubricant directing means continuously directs fluid lubricant to the midportion of each hydrodynamic bearing so that fluid lubricant flows outwardly in both directions through the spaces between the bearings and the shaft, and wherein each hydrodynamic bearing has at least one passageway formed therethrough for directing fluid lubricant from one end of the bearing to the drain means of the housing.

26. A mechanism comprising:

structure for receiving piece parts to be operated on by means of vibration;

means mounting the piece part receiving structure for vibration;

a tubular housing connected to the piece part receiving structure at spaced points;

a shaft extending through the tubular housing;

a pair of hydrodynamic bearings mounted in the tubular housing at points underlying the spaced points of connection of the tubular housing to the piece part receiving structure and rotatably supporting the shaft;

eccentric weight means mounted on the shaft for rotation therewith about circular paths overlying the hydrodynamic bearings;

means for rotating the shaft and the eccentric weight means mounted thereon and thereby generating vibration which is transmitted to the apparatus for receiving piece parts through the hydrodynamic bearings and the housing;

the shaft and the tubular housing having matched deflection characteristics under the loads imposed by rotation of the shaft and the eccentric weight means mounted thereon to generate vibration whereby the hydrodynamic bearings and the portions of the shaft extending therethrough are maintained in precise alignment.

27. The vibratory mechanism according to claim 26 further including thrust bearing means for axially positioning the shaft relative to the housing.

28. The vibratory mechanism according to claim 27 further characterized by means for directing fluid lubricant to the hydrodynamic bearings and the thrust bearing means, and wherein the tubular housing further comprises drain means for receiving fluid lubricant from the hydrodynamic bearings and the thrust bearing means.

29. The vibratory mechanism according to claim 28 wherein the fluid lubricant directing means continuously directs fluid lubricant to the midportion of each hydrodynamic bearing so that fluid lubricant flows outwardly in both directions through the spaces between the bearings and the shaft, and wherein each hydrodynamic bearing has at least one passageway formed therethrough for directing fluid lubricant from one end of the bearing to the drain means of the housing.

30. A mechanism comprising:

structure for receiving piece parts to be operated on by means of vibration;

means mounting the piece part receiving structure for vibration;

a tubular housing:

gimbal means pivotally connecting the tubular housing to the piece part receiving structure at spaced points;

a shaft extending through the tubular housing;

a pair of hydrodynamic bearings mounted in the tubular housing and rotatably supporting the shaft;

eccentric weight means mounted on the shaft for rotation therewith;

means for rotating the shaft and the eccentric weight means mounted thereon and thereby generating vibration which is transmitted to the apparatus for receiving piece parts through the hydrodynamic bearings and the housing;

the shaft and the tubular housing having matched deflection characteristics under the loads imposed by rotation of the shaft and the eccentric weight means mounted thereon to generate vibration whereby the hydrodynamic bearings and the portions of the shaft extending therethrough are maintained in precise alignment.

31. The vibratory mechanism according to claim 30 wherein the tubular housing is connected to the apparatus for receiving piece parts at spaced points, wherein the hydrodynamic bearings are mounted within the tubular housing at positions located just outwardly from the points of connection of the tubular housing to the apparatus for receiving piece parts, and wherein the eccentric weights are mounted on the shaft at points located just outwardly of the positions of the hydrodynamic bearings.

32. The vibratory mechanism according to claim 31 further including thrust bearing means for axially positioning the shaft relative to the housing.

33. The vibratory mechanism according to claim 32 further characterized by means for directing fluid lubricant to the hydrodynamic bearings and the thrust bearing means, and wherein the tubular housing further comprises drain means for receiving fluid lubrication from the hydrodynamic bearings and the thrust bearing means.

34. The vibratory mechanism according to claim 33 wherein the fluid lubricant directing means continuously directs fluid lubricant to the midportion of each hydrodynamic bearing so that fluid lubricant flows outwardly in both directions through the spaces between the bearings and the shaft, and wherein each hydrodynamic bearing has at least one passageway formed therethrough for directing fluid lubricant from one end of the bearing to the drain means of the housing.

35. The vibratory mechanism according to claim 30 wherein the gimbal means comprises ball bearings connecting the tubular housing to the piece part receiving structure.

* * * * *